United States Patent
Lee

(10) Patent No.: US 10,084,306 B2
(45) Date of Patent: Sep. 25, 2018

(54) CIRCUIT BREAKER HAVING SAFETY SWITCHING PART

(71) Applicant: LSIS CO., LTD., Anyang-si, Gyeonggi-do (KR)

(72) Inventor: Sangchul Lee, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 299 days.

(21) Appl. No.: 15/089,018

(22) Filed: Apr. 1, 2016

(65) Prior Publication Data

US 2016/0301205 A1    Oct. 13, 2016

(30) Foreign Application Priority Data

Apr. 13, 2015   (KR) .................. 10-2015-0052070

(51) Int. Cl.
*H02H 7/04* (2006.01)
*H01H 71/02* (2006.01)
*H01H 71/08* (2006.01)
*H01H 71/12* (2006.01)
*H01H 9/22* (2006.01)

(52) U.S. Cl.
CPC ........ *H02H 7/042* (2013.01); *H01H 71/0228* (2013.01); *H01H 71/08* (2013.01); *H01H 71/125* (2013.01); *H01H 9/226* (2013.01); *H01H 2071/086* (2013.01)

(58) Field of Classification Search
CPC .... H02H 7/042; H01H 71/0228; H01H 71/08; H01H 71/125
See application file for complete search history.

(56) References Cited

U.S. PATENT DOCUMENTS

| | | | |
|---|---|---|---|
| 3,512,043 A * | 5/1970 | Stange | H01F 38/28 200/51 R |
| 5,917,686 A | 6/1999 | Chan et al. | |
| 6,507,255 B1 | 1/2003 | Ennis et al. | |
| 7,561,396 B2 * | 7/2009 | Song | H02H 7/04 361/35 |
| 7,983,014 B2 | 7/2011 | Shibayama et al. | |

(Continued)

FOREIGN PATENT DOCUMENTS

| CN | 101345166 A | 1/2009 |
|---|---|---|
| CN | 102971821 A | 3/2013 |

(Continued)

OTHER PUBLICATIONS

Chinese Office Action for related Chinese Application No. 201610228860.X; action dated Sep. 27, 2017; (5 pages).

(Continued)

*Primary Examiner* — Scott Bauer
(74) *Attorney, Agent, or Firm* — K&L Gates LLP

(57) ABSTRACT

A circuit breaker includes a circuit breaker main body unit having a main circuit unit forming a circuit line of each phase, a current transformer part having a coil disposed in the circuit line of each phase and a pair of terminals extending from both ends of the coil and selectively connected to an external power source unit, and a safety switching part configured to connect the pair of terminals such that the pair of terminals are not opened, when the power source unit and the pair of terminals are separated.

4 Claims, 7 Drawing Sheets

(56) References Cited

U.S. PATENT DOCUMENTS

| | | | | |
|---|---|---|---|---|
| 2009/0186504 A1* | 7/2009 | Santos | ............... | H01F 27/04 |
| | | | | 439/188 |
| 2012/0001706 A1 | 1/2012 | Heckenkamp et al. | | |
| 2013/0049486 A1* | 2/2013 | Fischer | ............ | H01H 71/125 |
| | | | | 307/134 |

FOREIGN PATENT DOCUMENTS

| | | |
|---|---|---|
| JP | 2004201372 | 7/2004 |
| JP | 2005304148 | 10/2005 |
| JP | 5220680 | 6/2013 |
| JP | 5322784 | 10/2013 |
| JP | 5402378 | 1/2014 |
| KR | 200220666 | 4/2001 |
| KR | 100365653 | 12/2002 |
| KR | 20040039556 | 5/2004 |
| KR | 100543738 | 1/2006 |
| KR | 10-0854387 | 9/2008 |
| KR | 10-0955719 | 5/2010 |
| KR | 101273144 | 6/2013 |
| KR | 10-1451387 | 10/2014 |

OTHER PUBLICATIONS

Korean Intellectual Property Office Application No. 10-2015-0052070, Search report dated Jun. 22, 2015, 3 pages.
Korean Intellectual Property Office Application Serial No. 10-2015-0052070, Office Action dated Jul. 7, 2016, 4 pages.
European Patent Office Application Serial No. 16163677.4, Search Report dated Sep. 7, 2016, 8 pages.

* cited by examiner though a current ratio between primary and secondary coils is in inverse proportion to each of the number of windings of the primary and secondary coils.

CIRCUIT BREAKER HAVING SAFETY SWITCHING PART

CROSS-REFERENCE TO RELATED APPLICATION

Pursuant to 35 U.S.C. § 119(a), this application claims the benefit of earlier filing date and right of priority to Korean Application No. 10-2015-0052070, filed on Apr. 13, 2015, the contents of which are all hereby incorporated by reference herein in its entirety.

BACKGROUND OF THE INVENTION

1. Field of the Invention

The present disclosure relates to a circuit breaker having a safety switching part, and particularly, to a circuit breaker having a safety switching part capable of preventing opening of a secondary side terminal of a current transformer when a protecting relay is separated from a main body of the circuit breaker, thus preventing damage to the current transformer and an electric shock accident in advance.

2. Background of the Invention

In general, in a circuit breaker, two current transformers are installed in a main circuit of each phase, and one of the two current transformers is used for measuring a current and the other is used to provide power to a protecting relay connected to the circuit breaker.

In general, a current transformer is a transformer used to widen a measurement range of an alternating current (AC) ammeter by obtaining a small current in proportion to a large AC current from the large AC current.

As for a structure of a current transformer, a primary coil having a small number of windings wound around a laminated iron core and a secondary coil having a large number of windings wound around the laminated iron core, like a transformer. A measurement devices such as an ammeter, a wattmeter, a relay, and the like, are connected to the secondary coil.

FIG. 1 is a perspective view illustrating a configuration in which a main body part of a related art circuit breaker and a protecting relay are coupled, and FIG. 2 is a circuit diagram illustrating connections among main circuit units of the related art circuit breaker main body unit, current transformers, and a protecting relay.

Referring to FIG. 1, in general, a first connector 11 is installed on one side of a main body unit 10 of a circuit breaker which interrupts a fault current.

Also, a second connector 21 connected to the first connector 11 is installed on one side of the protecting relay 20.

Referring to FIG. 2, a main circuit unit 12 is provided in each phase of the circuit breaker main body unit 10, and two current transformers are installed for each phase.

A measurement current transformer 31 is used to measure a current flowing in the main circuit unit 12, and a power supply current transformer 32 is used for supplying power.

A secondary side terminal 32b of the power supply current transformer 32 used for supplying power is connected to a power source unit 23 of the protecting relay 20.

Also, a secondary side terminal of the measurement current transformer 31 is connected to a measurement unit 22 of the protecting relay 20.

In the aforementioned connection scheme, the first and second connectors 11 and 21 are connected to form a conduction state.

In a state in which the circuit breaker main body unit 10 and the protecting relay 20 are coupled, when the protective relay 20 is physically separated from the circuit breaker main body unit 10 for maintenance, the first and second connectors 11 and 21 are also separated from each other.

Thus, the secondary side terminal of the measurement current transformer 31 is separated from the signal measurement unit 22, and the secondary side terminal 32b of the power supply current transformer 32 is separated from the power source unit 23.

Accordingly, the secondary side terminals of the current transformers 31 and 32 are open.

Here, as for characteristics of a current transformer, a rated value of a primary current of the transformer may be various ranging from tens of ampere (A) to thousands of amperes (A), but a rated value of a secondary current is 5 A in most cases, and a current ratio between primary and secondary coils is in inverse proportion to each of the number of windings of the primary and secondary coils.

As for the secondary side terminal of the current transformer, it is safe to short the secondary side terminal, but it is very dangerous to open the secondary side terminal.

This is because, when the secondary coil or terminal is opened in a state in which a current flows in the primary coil, a primary side current acts to magnetize the entire iron core to cause the iron core to be saturated to heat, causing a high possibility of damage to the coil, explosion of the current transformer, or an electric shock accident.

Here, the measurement current transformer 31 used for the purpose of measurement forms a current lower than that of the power supply current transformer, so it may be safe.

Meanwhile, in the case of the power supply current transformer 32, since it is used for supplying power, a current thereof is formed to be higher than that of the measurement current transformer 31.

Thus, when the secondary side terminal 32b of the power supply current transformer 32 is opened, a high voltage is generated to damage the secondary side terminal 32b to damage the current transformer and cause an accident such as an electric shock accident, or the like.

In FIG. 2, reference numeral 32a denotes a primary side coil.

A related art document may be Korean Laid Open Publication No. 10-2004-0039556 (Publication date: May 12, 2004).

SUMMARY OF THE INVENTION

Therefore, an aspect of the detailed description is to provide a circuit breaker having a safety switching part, capable of preventing a device fault or a safety accident in advance by preventing secondary side terminals of a current transformer from being opened when a circuit breaker main body unit and a protecting relay are separated.

Another aspect of the detailed description is to provide a circuit breaker having a safety switching part, capable of safely repairing a circuit breaker main body unit in a state in which a protecting relay is separated.

To achieve these and other advantages and in accordance with the purpose of this specification, as embodied and broadly described herein, a circuit breaker may include: a circuit breaker main body unit having a main circuit unit forming a circuit line of each phase; a current transformer part having a coil disposed in the circuit line of each phase and a pair of terminals extending from both ends of the coil and selectively connected to an external power source unit; and a safety switching part configured to connect the pair of terminals such that the pair of terminals are not opened, when the power source unit and the pair of terminals are separated.

The power source unit may be provided in a protecting relay, and when the protecting relay and the circuit breaker main body unit are separated, the power source unit and the pair of terminals may be separated.

The safety switching part may include: a pair of connection contacts formed in the pair of terminals; a switch member configured to selectively connect the pair of connection contacts by an external force; and a pressing member installed on a side surface portion of the circuit breaker main body unit, and configured to press the switch member to connect the pair of connection contacts when coupled to the protecting relay, wherein the pressing member is pressed when an external force is applied to the side surface portion of the protecting relay coupled to the circuit breaker main body unit.

A first connector connected to the pair of terminals may be installed on the side surface portion of the circuit breaker main body unit, and a second connector connected to the power source unit and coupled to be electrically connected to the first connector may be installed on a side surface portion of the protecting relay.

The safety switching part may include: a sensor configured to sense separation between the first connector and the second connector and generate a separation signal according to the separation; and a controller configured to operate the switch member to connect the pair of connection contacts when the separation signal is received from the sensor.

The safety switching part may further include an auxiliary switching unit.

The auxiliary switching unit may include: a pair of auxiliary connection contacts formed in the pair of terminals, respectively; an auxiliary switching member configured to selectively switch the pair of auxiliary connection contacts upon receiving an electrical signal from the outside; and a signal generator installed in the circuit breaker main body unit and configured to generate an electrical signal for controlling a switching operation of the auxiliary switching member.

In the present disclosure, when the circuit breaker main body unit and the protecting relay are separated, the secondary side coil of the current transformer is not opened, thereby preventing a device fault and a safety accident in advance.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a circuit breaker having a safety switching part will be described with reference to the accompanying drawings.

Figure 1:
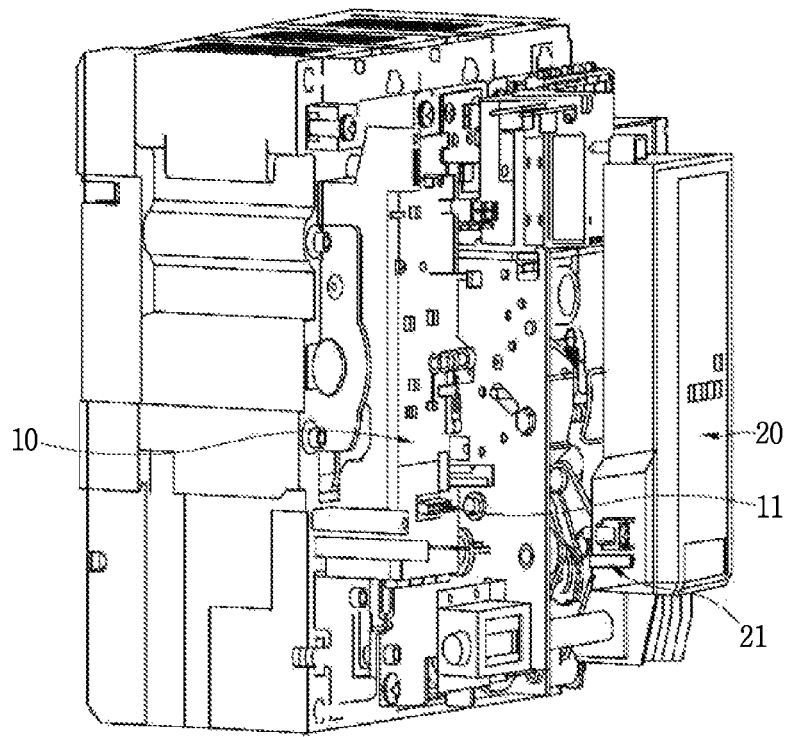
FIG. 1 is a perspective view illustrating a coupling relation between the related art circuit breaker main body unit and a protecting relay.
Figure 2:
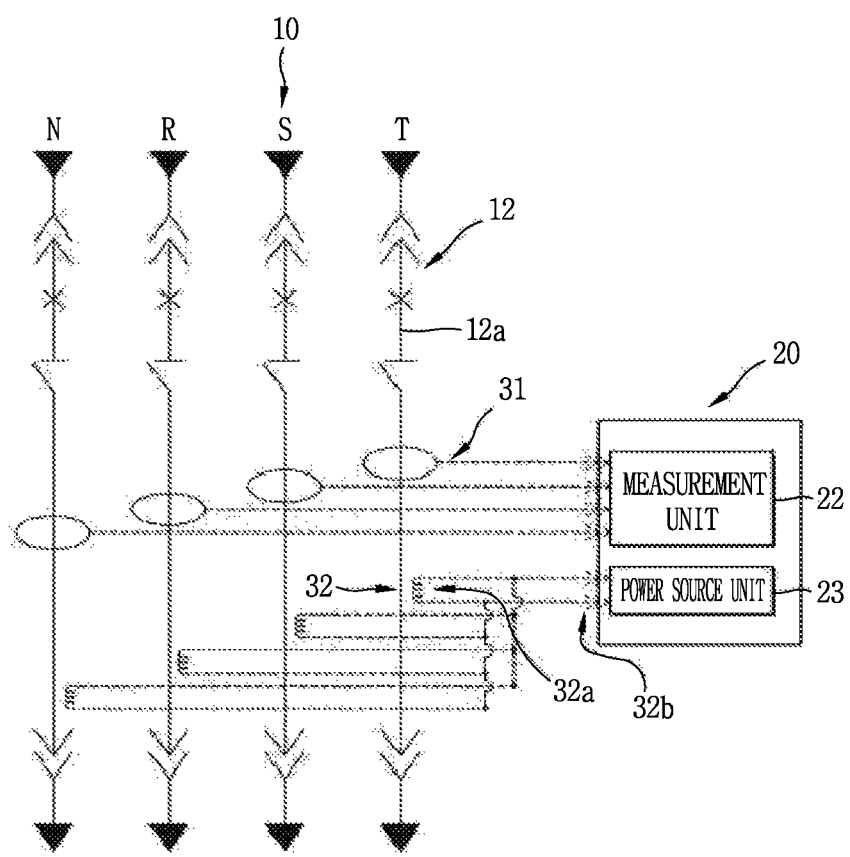
FIG. 2 is a circuit diagram illustrating connection relations among main circuit units of the related art circuit breaker main body unit, current transformers, and a protecting relay circuit.
Figure 3A:
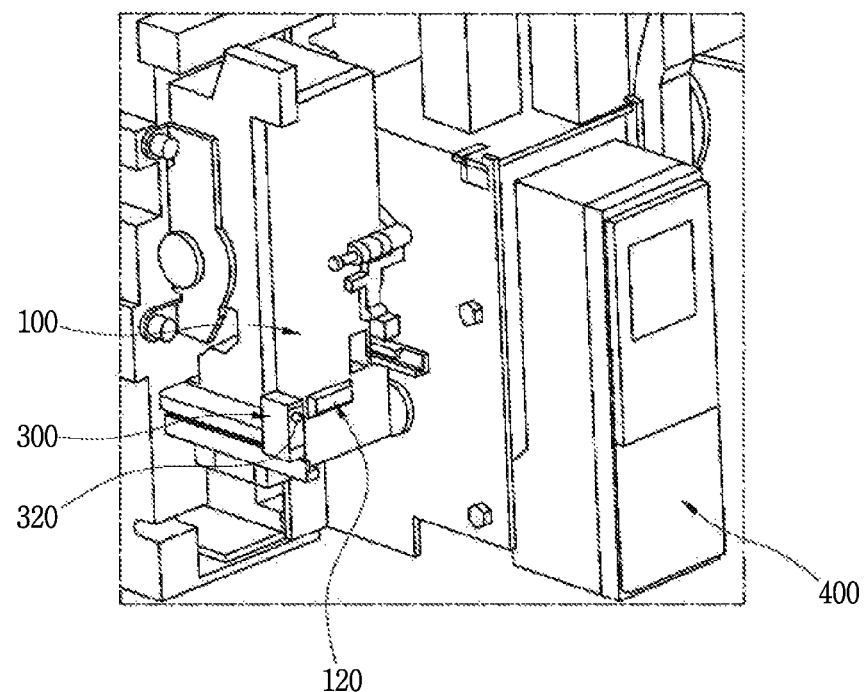
FIG. 3a is a perspective view illustrating a coupling relation between a circuit breaker main body unit in which a safety switching part is installed and a protecting relay according to an embodiment of the present disclosure.
Figure 3B:
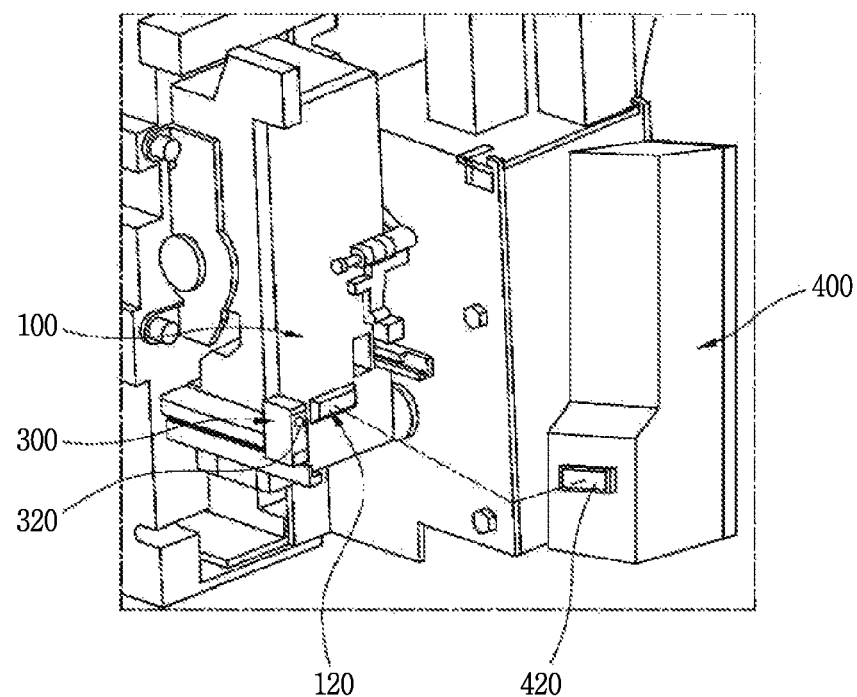
FIG. 3b is a different perspective view illustrating a coupling relation between a circuit breaker main body unit in which a safety switching part is installed and a protecting relay according to an embodiment of the present disclosure.
Figure 4:
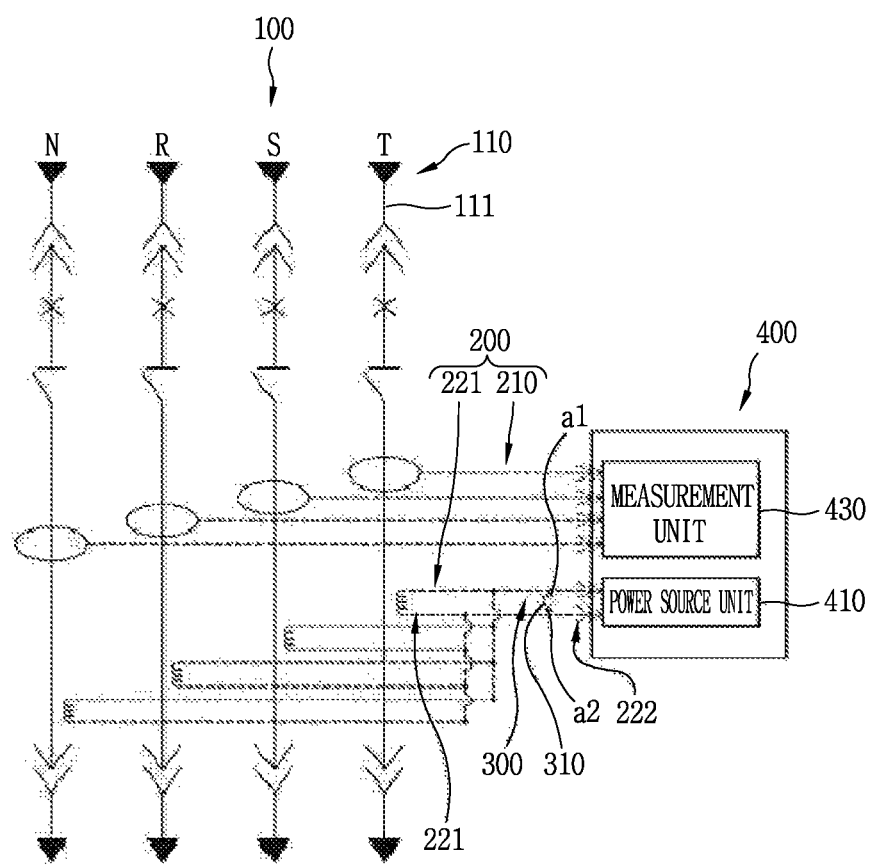
FIG. 4 is a circuit diagram illustrating circuit connections among main circuit units, current transformers, and a protecting relay according to an embodiment of the present disclosure.

FIG. 3a is a perspective view illustrating a coupling relation between a circuit breaker main body unit in which a safety switching part is installed and a protecting relay according to an embodiment of the present disclosure, FIG. 3b is a different perspective view illustrating a coupling relation between a circuit breaker main body unit in which a safety switching part is installed and a protecting relay according to an embodiment of the present disclosure, and FIG. 4 is a circuit diagram illustrating circuit connections among main circuit units, current transformers, and a protecting relay according to an embodiment of the present disclosure.

Referring to FIGS. 3A, 3B, and 4, a circuit breaker having a safety switching part according to an embodiment of the present disclosure includes a circuit breaker main body unit 100, a current transformer unit 200, and a safety switching part 300.

Circuit Breaker Main Body Unit 100

The circuit breaker main body unit 100 is a device for interrupting a current by forcibly separating a fixed contactor (not shown) and a movable contactor (not shown) when a fault current occurs.

The circuit breaker main body unit 100 may have a main circuit unit 110 including circuits 111 by phases as illustrated in FIG. 4.

Current Transformer Unit 200

Referring to FIG. 4, two current transformer units 200 are installed in each of the circuits for the phases.

The two current transformer units 200 installed in each of the circuits for phases include a measurement current transformer 210 and a power supply current transformer 220.

The power supply current transformer 220 includes a primary side coil 221 and a pair of secondary side terminals 222 extending from both ends of the primary side coil 221.

A primary side coil of the measurement current transformer 210 is positioned in each of the circuits 111, and a pair of secondary side terminals are electrically connected to a measurement unit 430 of the protecting relay 400.

Thus, a current measured from the primary side coil may be transmitted to the measurement unit 430.

A primary side coil 221 of the power supply current transformer 220 is positioned at each of the circuits 111, and the pair of secondary side terminals 222 are electrically connected to a power source unit 410 of the protecting relay 400.

Here, the power supply current transformer 220 forms a current higher than that of the measurement current transformer 210 and supplies power to the power source unit 410.

Here, the pair of secondary side terminals 222 of the power supply current transformer 220 are electrically connected to the first connector 120 formed on a left side of a front portion of the circuit breaker main body unit 100.

The power source unit 410 is electrically connected to a second connector 420 formed on a rear portion of the protecting relay 400.

Thus, when the first and second connectors 120 and 420 illustrated in FIG. 3 are coupled, the pair of secondary side terminals 222 of the power supply current transformer 220 may be electrically connected to the power source unit 410.

Safety Switching Part 300

Referring to FIGS. 3 and 4, the safety switching part 300 is installed in the circuit breaker main body unit 100.

The safety switching part 300 includes a pair of connection contacts a1 and a2, a switch member 310, and a pressing member 320.

As illustrated in FIG. 4, the pair of connection contacts a1 and a2 are formed at the pair of secondary terminals 222, respectively.

The switch member 310 is configured to selectively switch and connect the pair of connection contacts a1 and a2.

As illustrated in FIG. 3, the pressing member 320 is provided to protrude from a side surface portion of the circuit breaker main body unit 100.

That is, when the pressing member 320 is pressed by an external force, the pressing member 320 operates the aforementioned switch member 310 to maintain the pair of connection contacts a1 and a2 are maintained not to be connected.

Here, a pressing direction of the pressing member 320 may be the same as a coupling direction of the protecting relay 400 which is coupled to a front surface portion of the circuit breaker main body unit 100.

Thus, when the protecting relay 400 is moved in position so as to be tightly attached to the front surface portion of the circuit breaker main body 100, the first and second connectors 120 and 42 are physically coupled and connected to each other.

At the same time, the pressing member 320 provided to protrude from a front surface portion of the circuit breaker main body unit 100 is pressed by the rear side of the protecting relay 400 and the pair of connection contacts a1 and a2 are maintained not to be connected.

Hereinafter, an operation of the safety switching part according to an embodiment of the present disclosure configured as described above will be described.

Referring to FIGS. 3 and 4, the protecting relay 400 is couple to be tightly attached to a front surface portion of the circuit breaker main body unit 100.

Here, the pressing member 320 provided on one side of the front surface portion of the circuit breaker main body unit 100 is pressed by one side of the rear surface portion of the protecting relay 400.

Also, the first and second connectors 120 and 420 may be connected to each other, and the secondary side terminal 222 of the power supply current transformer is connected to the power source unit 410.

When the pressing member 320 is pressed, the switch member 310 disconnects the pair of connection contacts a1 and a2 formed at the pair of secondary side terminals 222 of the power supply current transformer 220.

That is, in a state in which the circuit breaker main body unit 100 is coupled to the protecting relay 400, the pair of connection contacts a1 and a2 are maintained to be disconnected all the time.

Thus, power from the power supply current transformer 220 may be transmitted to the power source unit 410 of the protecting relay 400, and thus, the protecting relay 400 may be normally operated.

In this state, when the protecting relay 400 is inevitably separated from the circuit breaker main body unit 100 for maintenance of the circuit breaker main body unit 100, external force which has pressed the pressing member 320 through the side surface portion of the protecting relay 400 is removed and the pressing member 320 protrudes from its original position.

Here, since the pressing member 320 protrudes, the switch member 310 performs a switching operation to electrically connect the pair of connection contacts a1 and a2.

Thus, the secondary side terminals 222 of the power supply current transformer 220 may be short-circuited in a state of not being opened.

Thus, heating of an iron core generated when the secondary side terminals 222 are opened in a state in which a current flows in the primary side coils 221 of the power supply current transformer 220, and damage to the current transformer due to the heated iron core, a possibility of explosion of the current transformer, and a possibility of an electric shock may be solved.

That is, in the embodiment of the present disclosure, even though the circuit breaker main body unit and the protecting relay are forcibly separated, the pair of secondary side terminals of the power supply current transformer are immediately connected in parallel, whereby an accident due to formation of a high voltage may be prevented and maintenance and repair such as replacement of a component may be safely performed without completely turning off the circuit breaker main body unit.

Figure 5:
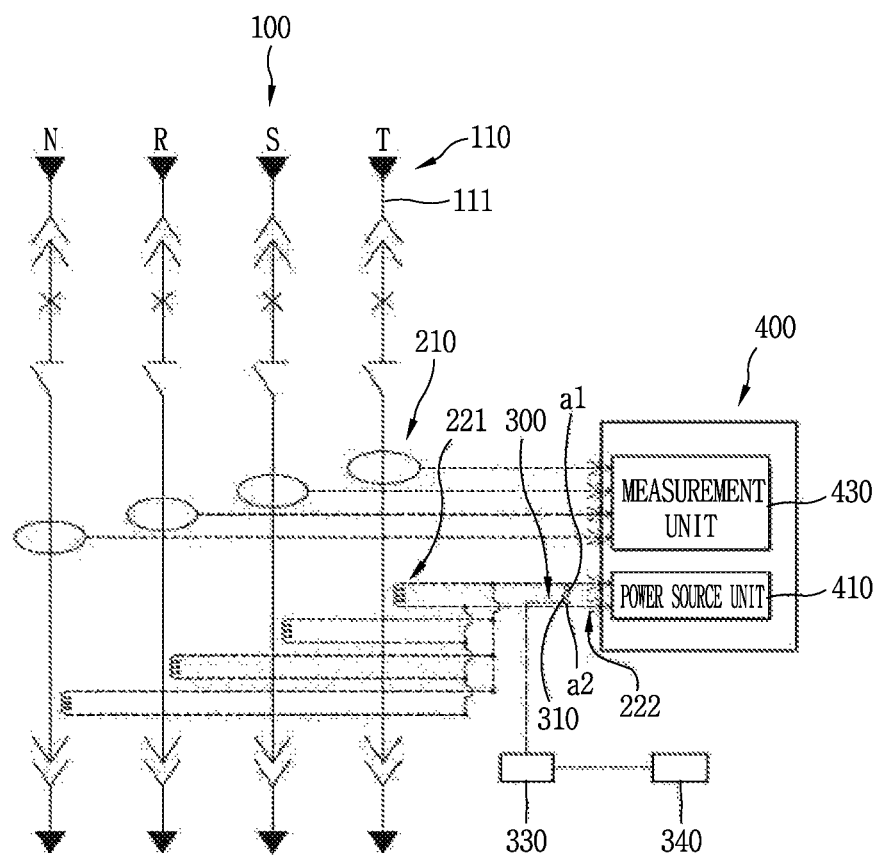
FIG. 5 is a circuit diagram illustrating another example of a safety switching part according to an embodiment of the present disclosure.

FIG. 5 is a circuit diagram illustrating another example of a safety switching part according to an embodiment of the present disclosure.

Components such as a circuit breaker main body unit, a protecting relay, a main circuit unit, and a current transformer part according to the present disclosure are the same as those illustrated in FIG. 3, and thus, a detailed description thereof will be omitted.

Referring to FIG. 5, a safety switching part 300 according to the present disclosure further includes a sensor 340 and a controller 330.

The sensor 340 may be a device for monitoring an electrical connection state of the first and second connectors 120 and 420 in real time.

That is, when the first and second connectors 120 and 420 are connected to each other, the sensor 340 transmits a signal regarding the connection to the controller 330, and when the first and second connectors 120 and 420 are separated as illustrated in FIG. 3, the sensor 340 transmits a disconnection or a separation signal to the controller 330.

Through this configuration, when the circuit breaker main body unit 100 and the protecting relay 400 are separated and the first and second connectors 120 and 420 are accordingly separated, the sensor 340 transmits a separation signal to the controller 330.

Here, when the separation signal is received, the controller 330 operates the switch member 310 according to an embodiment of the present disclosure to electrically connect the pair of connection contacts a1 and a2 formed in the secondary terminals 222 of the power supply current transformer 220.

According to another embodiment of the present disclosure, an auxiliary safety switch may be provided in preparation for a case in which the protecting relay separated from the circuit breaker main body unit does not returned to its original position because the pressing member according to the present disclosure is damaged. Also, a connection or separation state of the first and second connectors may be sensed without a separate pressing member on the side surface portion of the circuit breaker main body unit to disconnect the secondary side terminals of the power supply current transformer without opening the secondary side terminals.

Figure 6:
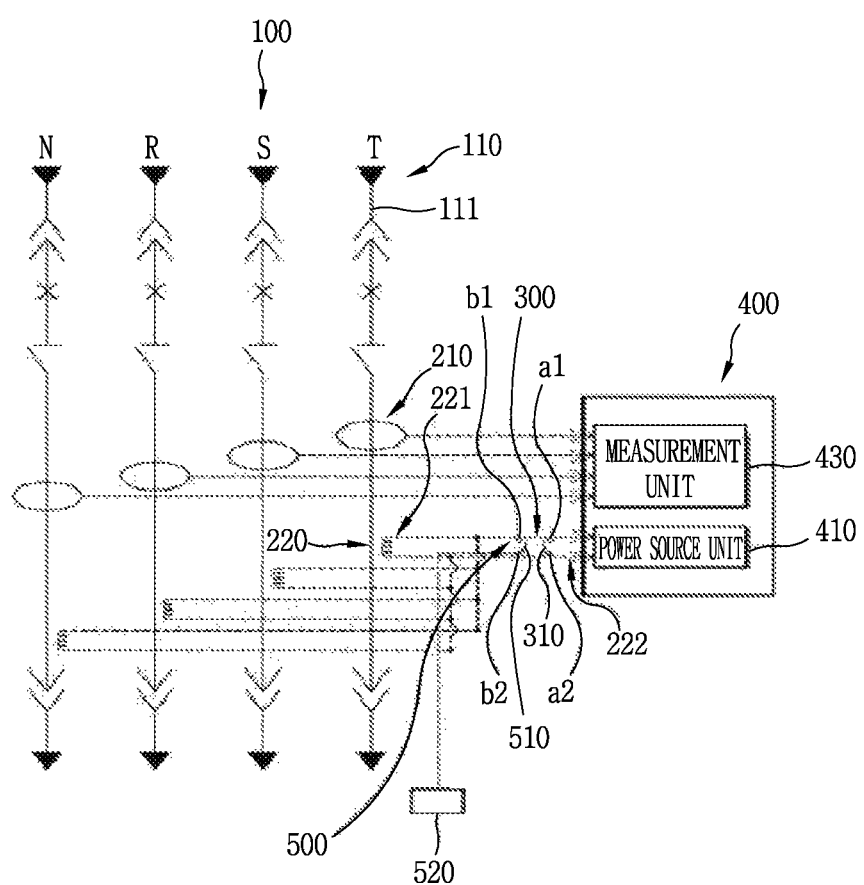
FIG. 6 is a circuit diagram illustrating another example of a safety switching part according to an embodiment of the present disclosure.

FIG. 6 is a circuit diagram illustrating another example of a safety switching part according to an embodiment of the present disclosure.

Components such as a circuit breaker main body unit, a protecting relay, a main circuit unit, and a current transformer part according to the present disclosure are the same as those illustrated in FIGS. 3 and 4, and thus, a detailed description thereof will be omitted.

Referring to FIG. 6, the safety switching part 300 according to the present disclosure further includes an auxiliary switching unit 500.

The auxiliary switching unit 500 may include a pair of auxiliary connection contacts b1 and b2 formed in the pair of secondary side terminals 222, an auxiliary switching member 510 selectively switching the pair of auxiliary connection contacts b1 and b2 upon receiving an electrical signal from the outside, and a signal generator 520 installed in the circuit breaker main body unit 100 and generating an electrical signal for controlling a switching operation of the auxiliary switching member 510.

Preferably, the signal generator 520 may be installed in a portion of the circuit breaker main body unit 100 other than a portion coupled to the protecting relay 400.

According to another embodiment of the present disclosure, when the first and second connectors 120 and 420 are separated as the circuit breaker main body unit 100 and the protecting relay 400 are physically separated and when the first and second connectors 120 and 420 are connected to each other, the secondary side terminals 222 of the power supply current transformer 220 may be disconnected, without being opened, by using the signal generator 520.

That is, the secondary side terminals 222 of the power supply current transformer 220 may be disconnected without being opened, by using the signal generator 520 outside of the circuit breaker main body unit 100.

In the embodiments of the present disclosure, according to the configurations and operations described above, when the circuit breaker main body unit and the protecting relay are separated, the secondary side terminals of the current transformer are not opened, thus a device fault and safety accident can be prevented in advance.

Also, in the embodiments of the present disclosure, in a state in which the protecting relay is separated, the circuit breaker main body unit may be safely repaired.

The specific embodiments of the circuit breaker having the safety device have been described, but the present disclosure may be variously modified within the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A circuit breaker comprising:
a circuit breaker main body unit having a main circuit unit forming a circuit line of each phase;
a current transformer part having a coil disposed in the circuit line of each phase and a pair of terminals extending from both ends of the coil and selectively connected to an external power source unit; and
a safety switching part configured to connect the pair of terminals such that the pair of terminals are not opened, when the external power source unit and the pair of terminals are separated,
wherein the external power source unit is provided in a protecting relay,
wherein when the protecting relay and the circuit breaker main body unit are separated, the external power source unit and the pair of terminals are separated,
wherein the safety switching part comprises:
a pair of connection contacts formed in the pair of terminals;
a switch member selectively connecting the pair of connection contacts; and
a pressing member protrusively installed on a side of a front portion of the circuit breaker main body unit, and being in contact with the switch member, and
wherein when the protecting relay is coupled to the circuit breaker main body unit, the pressing member is pressed by the rear side of the protecting relay to press the switch member, which allows the switch member to disconnect the pair of connection contacts.

2. The circuit breaker of claim 1, wherein a first connector connected to the pair of terminals is installed on the side surface portion of the circuit breaker main body unit, and a second connector connected to the external power source unit and coupled to be electrically connected to the first connector is installed on a side surface portion of the protecting relay.

3. The circuit breaker of claim 2, wherein the safety switching part comprises:
   a sensor configured to sense separation between the first connector and the second connector and generate a separation signal according to the separation; and
   a controller configured to operate the switch member to connect the pair of connection contacts when the separation signal is received from the sensor.

4. The circuit breaker of claim 1, wherein the safety switching part further comprises an auxiliary switching unit, wherein the auxiliary switching unit comprises:
   a pair of auxiliary connection contacts formed in the pair of terminals, respectively;
   an auxiliary switching member configured to selectively switch the pair of auxiliary connection contacts upon receiving an electrical signal from the outside; and
   a signal generator installed in the circuit breaker main body unit and configured to generate an electrical signal for controlling a switching operation of the auxiliary switching member.

* * * * *